United States Patent [19]

Fujio et al.

[11] Patent Number: 4,475,185
[45] Date of Patent: Oct. 2, 1984

[54] RECORD PLAYER WITH VIBRATION CANCELLATION MECHANISM

[75] Inventors: Kazuyuki Fujio; Masao Suzuki; Katsumi Sasamoto; Yasuji Ikari, all of Tokyo, Japan

[73] Assignee: Sansui Electric Co., Ltd., Tokyo, Japan

[21] Appl. No.: 386,382

[22] Filed: Jun. 8, 1982

[30] Foreign Application Priority Data

Jun. 10, 1981 [JP] Japan .................................. 56-89308

[51] Int. Cl.$^3$ ............................................. G11B 25/04
[52] U.S. Cl. .................................................. 369/265
[58] Field of Search ................ 369/264, 265, 267, 263

[56] References Cited

U.S. PATENT DOCUMENTS 4,425,638  1/1984  Suzuki et al. ...................... 369/265

Primary Examiner—Steven L. Stephan
Attorney, Agent, or Firm—Sughrue, Mion, Zinn, Macpeak and Seas

[57] ABSTRACT

In a record player of the direct drive system wherein a turntable and a motor for driving the turntable are directly coupled; a record player characterized in that a cancellation mechanism is disposed coaxially with the driving motor, said cancellation mechanism performing a reciprocating rotational motion to generate to a torque equal in magnitude and reverse in direction with respect to a torque fluctuation developed by rotation of said driving motor, thereby to cancel counteractive rotational vibrations exerted on a cabinet of said record player by said driving motor.

27 Claims, 57 Drawing Figures

RECORD PLAYER WITH VIBRATION CANCELLATION MECHANISM

BACKGROUND OF THE INVENTION

The present invention relates to a record player of the direct drive system, and more particularly to the prevention of vibrations during the rotation of a turntable.

FIGS. 1 and 2 are a front view and a plan view showing an example of a prior-art record player of the direct drive system. Referring to the figures, numeral 1 designates a cabinet, and numeral 3 a driving motor which drives a turntable 2 to rotate. Numeral 4 indicates a tone arm which holds a cartridge at its fore end, and numeral 6 insulators which resiliently hold the cabinet 1.

Here, in driving the turntable 2 by means of the driving motor 3, a torque (indicated by arrow R in FIG. 2) acts. On the other hand, as a counteraction against the torque, a torque in the opposite direction (indicated by arrow L in FIG. 2) acts on the cabinet 1 on which the stator of the driving motor 3 is mounted. In such case, forces based on the action and the counteraction become equal in magnitude and opposite in direction. In a case where the driving motor 3 rotates in a constant-speed state and where the developed torques undergo no change with time, a stress ascribable to the counteraction on the cabinet 1 remains at a constant value. In actuality, however, even when the driving motor 3 is in the constant-speed drive state, the developed torques change every moment and also the counteractive force on the cabinet 1 changes vibratorily every moment. In this regard, in a case where the insulators preventive of floor vibrations are not disposed and where the cabinet 1 is placed directly on an object of sufficiently great mass, the rotational vibrations of the cabinet 1 are very small. In order to reduce the influence of the floor vibrations, however, the cabinet 1 needs to be held through the insulators 6 made of an elastic material. In case of employing such insulators 6, the cabinet 1 induces the rotational vibrations on account of the vibratory counteraction ascribable to the torque fluctuations. These rotational vibrations vibrate, not only the cabinet 1, but also the tone arm 4 carried thereon. Accordingly, they affect the playback signal of a record very adversely. In particular, they form causes for the cross modulation distortion and deterioration in the S/N (signal-to-noise) ratio and also deteriorate the phase distortion characteristic etc.

As thus far described, in the record player of the so-called direct drive system wherein the turntable is directly driven by the motor, the cabinet as well as the tone arm is inevitably affected adversely by the counteraction due to the torque based on the rotation of the motor.

SUMMARY OF THE INVENTION

The present invention has been made in view of the circumstances described above, and has for its object to provide a record player of little cross modulation distortion and good S/N ratio.

More specifically, a cabinet is equipped with a cancellation mechanism for cancelling a vibratory reaction attributed to a motor for driving a turntable, thereby to cancel the rotational vibrations of the cabinet and to reduce vertical vibrations which develop depending upon the correlation among the rotational vibrations of the cabinet, the center of gravity of the record player, insulators, etc.

BRIEF DESCRIPTION OF THE DRAWINGS

FIGS. 4 to 10 illustrate an embodiment of the present invention, in which FIG. 4 is a front view partly taken in vertical section, FIG. 5 is a plan view partly broken away, FIG. 6 is a graph showing torques during the operation of a driving motor included in the embodiment, FIG. 7 is a plan view of a cancellation mechanism featuring the embodiment, FIG. 8 is an arrangement plan of a rotor magnet poles in the cancellation mechanism, FIG. 9 is a front view of the cancellation mechani and FIG. 10 is a block diagram showing the electrical system of the embodiment;

FIGS. 11A and 11B are diagrams for explaining the measurement of the vibration characteristics of the embodiment in FIGS. 4 to 10, while

FIG. 13 is a diagram for explaining the measurement of the cross modulation distortion characteristic of the embodiment, while

PREFERRED EMBODIMENTS OF THE INVENTION

Hereunder, an embodiment of the present invention will be described in detail with reference to FIGS. 3 to 14 of the drawings.

Figure 1:
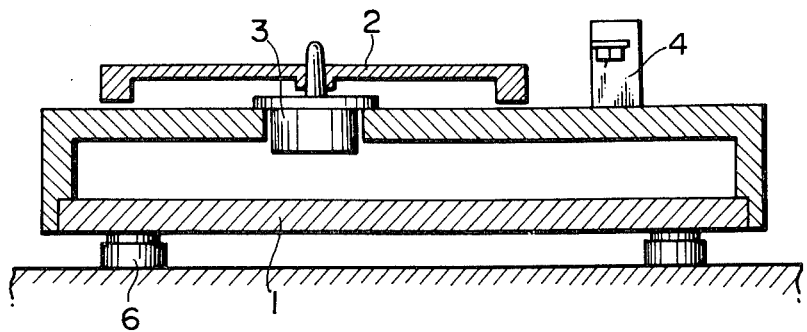
FIGS. 1 to 3 are a front view, partly in vertical section, showing an example of a prior-art record player, a plan view of the example, and a graph showing torques during the operation of a driving motor included in the example, respectively.
Figure 2:
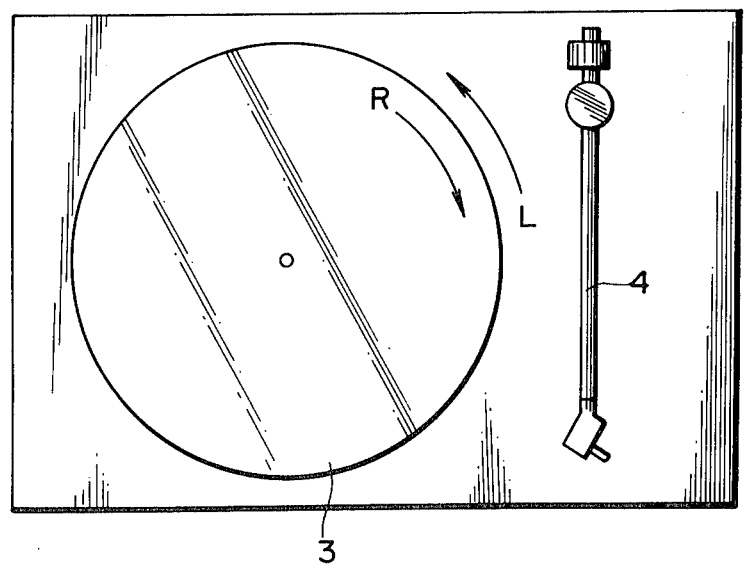
Figure 3:
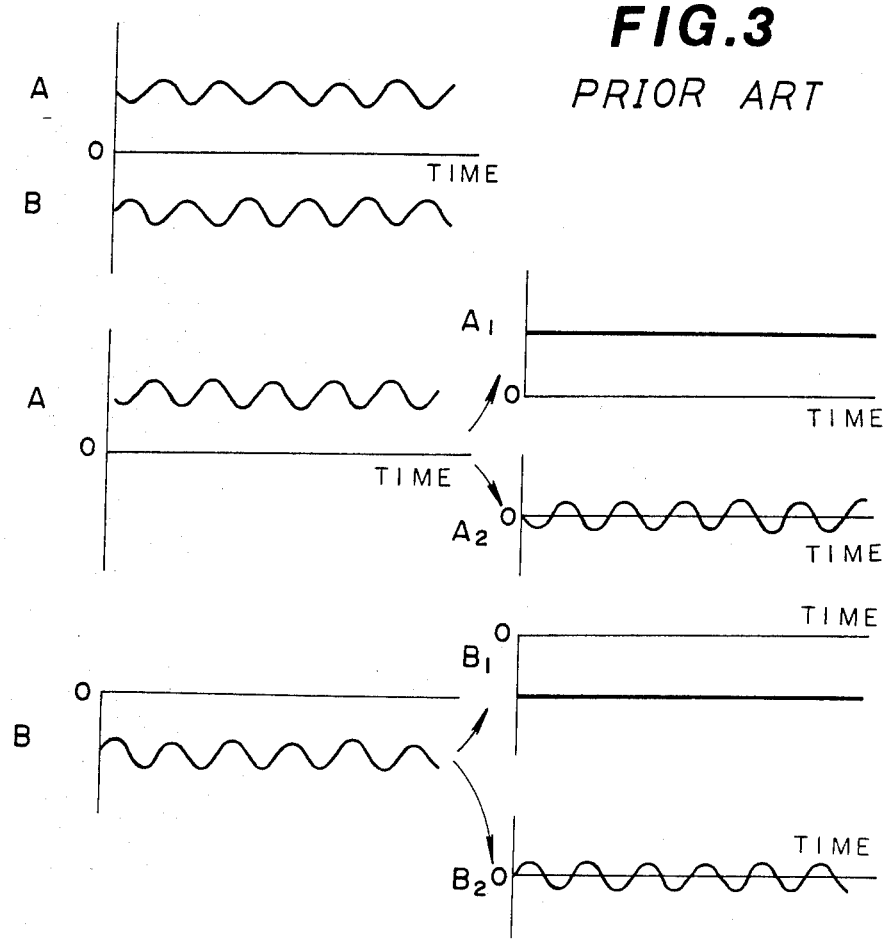

Now, let's study on the rotational vibrations of a cabinet in a record player of the direct drive system. While several sources of the vibrations are considered, the most influential are an action and a counteraction which are ascribable to a motor for driving a turntable. A torque which is developed by the driving motor does not have a constant value even during the steady rotation of the motor, but it fluctuates with time because a control is made so that the rotational frequency of the turntable may be held constant at all times. FIG. 3 is a graph illustrative of this situation. An active force based on the torque generated by the driving motor is vibratory as illustrated at A. On the other hand, a counteractive force on the cabinet is equal in magnitude and reverse in direction with respect to the active force as illustrated at B.

The active force A consists of the component of a constant torque $A_1$ which does not change with time and which serves to rotate the turntable at a substantially constant speed whilst overcoming the resistance of the bearing portion of the motor, etc., and the component of a vibratory torque $A_2$ which changes with time in order to hold the rotational frequency of the turntable constant by controlling it every moment. In these torques $A_1$ and $A_2$, the constant torque $A_1$ produces the torque $B_1$ of the counteraction on the cabinet, and this torque $B_1$ constituting the counteractive force B acts at a constant magnitude and reversely to the rotational direction of the turntable. Accordingly, this torque $B_1$ is static and does not especially have any evil effect on the playback signal of a record. In contrast, the constituent torque $B_2$ of the counteraction B on the cabinet as produced by the vibratory torque $A_2$ is vibratory and therefore results in affecting the playback signal of the record adversely.

In view of the circumstances described above, according to the present invention, a record player of the direct drive system is equipped, coaxially with a driving motor, with a vibration cancellation mechanism which generates a torque equal in magnitude and reverse in direction with respect to a vibratory torque generated by the driving motor, whereby the occurrence of vibrations is cancelled so as to ensure a playback signal of high quality.

Figure 4:
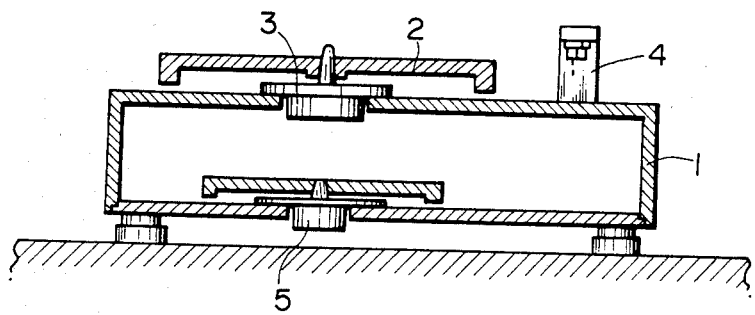
Figure 5:
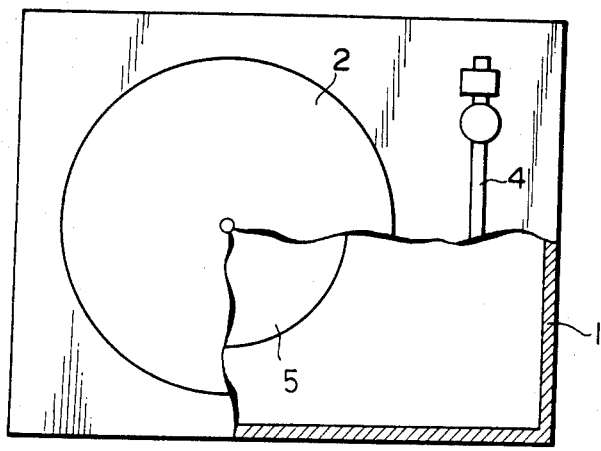

FIG. 4 is a front view showing the embodiment of the present invention, while FIG. 5 is a corresponding plan view. Referring to the figures, a turntable 2 is arranged over the top of a cabinet 1, and it is held by a driving motor 3 so as to be driven to rotate. Shown at numeral 4 is a tone arm which holds a cartridge at its fore end. Numeral 5 denotes a cancellation mechanism which is disposed coaxially with the driving motor 3 and which cancels a vibratory torque developed by the rotation of the driving motor 3.

Figure 6:
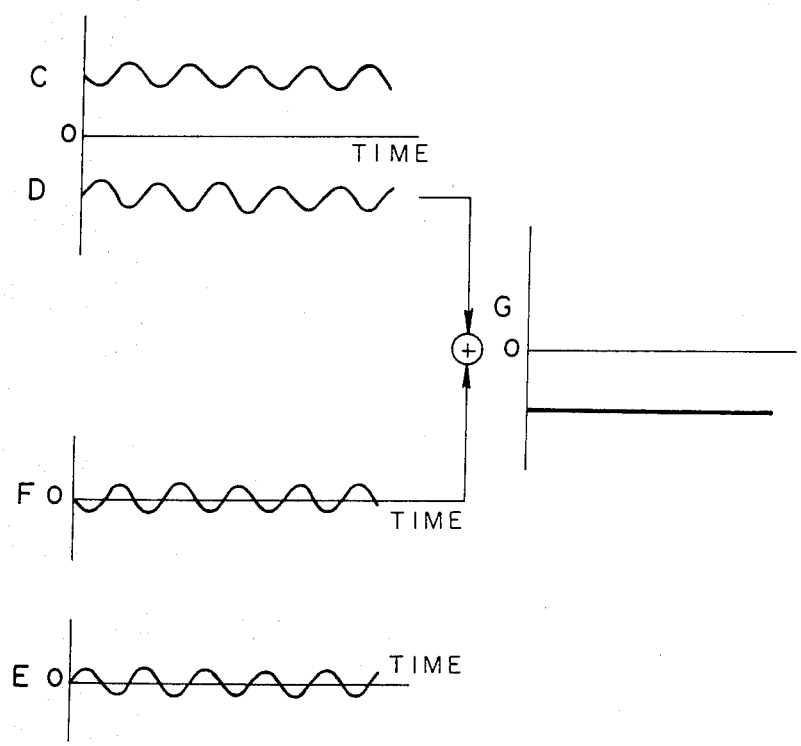

With such construction, the driving motor 3 of the turntable 2 exerts a stress on the cabinet 1 as illustrated in FIG. 6. More specifically, a torque C is exerted by the action of the driving motor on the turntable, and a torque D is exerted as the counteraction on the cabinet. These torques C and D are vibratory, and are equal in magnitude and reverse in direction to each other. In order to avoid the adverse effect described before, accordingly, a cancelling torque E equal in magnitude and reverse in direction to the fluctuating component of the torque C based on the active force of the driving motor is generated by the cancellation mechanism 5. Thus, the cancelling torque E exerts a torque F on the cabinet counteractively, and this torque F and the fluctuating component of the torque D based on the counteraction of the driving motor 3 are equal in magnitude and reverse in direction to each other. Accordingly, a torque G with the counteractive torques D and F on the cabinet combined can be held constant.

Figure 7:
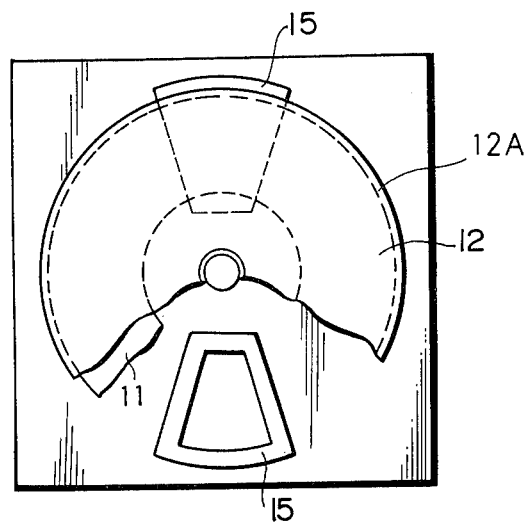
Figure 8:
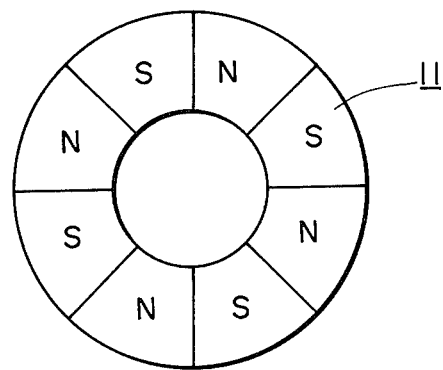
Figure 9:
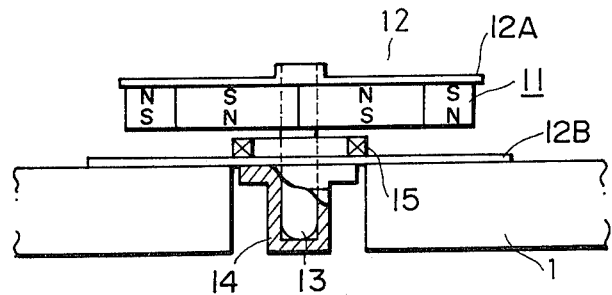

FIGS. 7, 8 and 9 are a plan view showing the structure of the cancellation mechanism, an arrangement plan of magnet poles, and a front view of the structure, respectively. The N-poles and S-poles of magnets 11 numbering, for example, eight are alternately arranged along the peripheral edge of a disc-shaped yoke 12A, so as to have opposite polarities in a direction of a thickness of the magnet. A center shaft 13 is disposed at the center of the yoke 12A, and is turnably held by a bearing 14. A stationary yoke 12B confronts the magnets 11, and has two driving coils 15 mounted thereon.

The rotor 12 of the cancellation mechamism does not perform a rotational motion continuously in a fixed direction, but it may perform a rotational reciprocating motion for the center shaft 13. Accordingly, only one phase of current needs to be applied to the driving coils 15. This signifies a very simple arrangement in which switching elements and a switching circuit for changing-over driving currents in respective phases, etc. are not required. That is, a magnetic circuit and the moment of inertia of the rotor may be so designed that the torque equal in magnitude to the fluctuating component of the torque developed by the driving motor 3 of the turntable 2 is generated by the cancellation mechanism 5, and that the rotor of the cancellation mechanism lies within a predetermined effective drive range.

The magnets 11 and the yoke 12A made of a ferromagnetic material are unitarily installed on the center shaft 13, and the resultant structure is turnably held by the bearing 14. Accordingly, when currents in an identical direction are caused to flow through the respective driving coils 15, torques proportional to the driving currents can be generated between the magnets 11 of the rotor and the driving coils 15.

While, in the embodiment, the driving coils 15 are arranged in the number of two, a single driving coil or three or more driving coils may be disposed as well.

Figure 10:
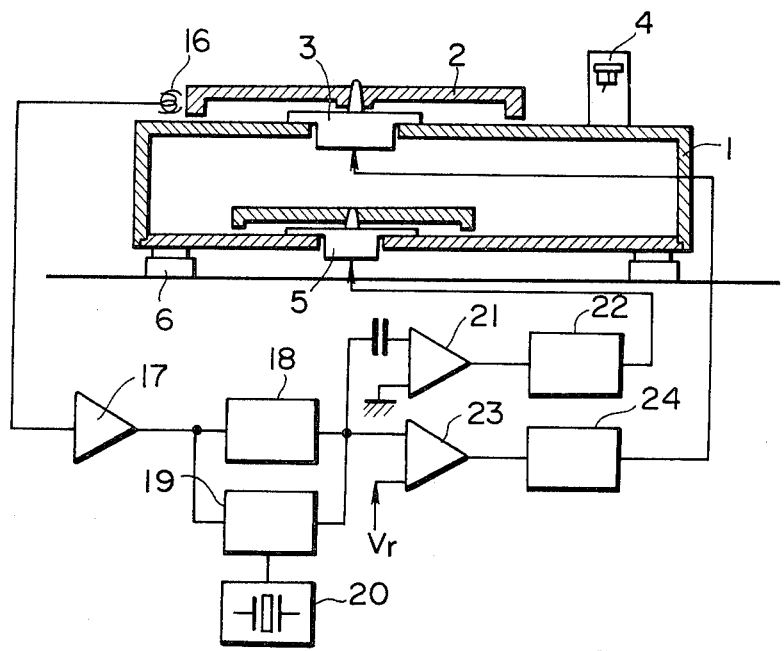

FIG. 10 is a block diagram showing the arrangement of an electric circuit in the embodiment. A speed sensor 16 detects the rotation of the turntable 2 in the form of pulses at a frequency proportional to the rotational speed of the turntable. After the train of pulses are amplified to a predetermined level by an amplifier 17, they are applied to an F/V (frequency-to-voltage) converter 18 and a phase comparator 19. Here, the F/V converter 18 decreases its output voltage as the rotational frequency of the turntable 2 rises, whereas it increases its output voltage as the rotational frequency lowers. The phase comparator 19 executes the phase comparison between the pulses detected by the speed sensor 16 and pulses of stable frequency oscillated by a reference oscillator 20, and provides the resulting difference in the form a voltage. In this case, when the phase of the output signal of the amplifier 17 leads over that of the pulse signal of the reference oscillator 20, the output voltage of the phase comparator 19 becomes smaller, whereas when it lags, the output voltage becomes greater. The outputs of the F/V converter 18 and the phase comparator 19 have only their A.C. components applied to a counteraction cancelling driver circuit 22 through an amplifier 21. In addition, these outputs as combined are compared by an amplifier 23 with a reference voltage $V_r$ corresponding to a set speed, and the resulting difference voltage is applied to a motor driver circuit 24. The counteraction cancelling driver circuit 22 and the motor driver circuit 24 are circuits which supply driving currents proportional to their input voltages. The respective driver circuits 22 and 24 apply the driving currents to the driving coils 15 of the cancellation mechanism 5 and the motor 3 for driving the turntable 2, to generate torques proportional to the magnitudes thereof. In the torque generated by the driving motor 3, the vibratory torque component changing with time develops due to the control of the turntable 2 into a constant rotational frequency. The torque to be generated by the driving motor 3 is determined by a torque command voltage which is the sum voltage between the output voltage of the F/V converter 18 and that of the phase comparator 19. Accordingly, the input signal to the counteraction cancelling driver circuit 22 is obtained by amplifying that A.C. component of the torque command voltage which is other than a biased D.C. voltage. Owing to the driving current of the counteraction cancelling driver circuit 22, the torque generated by the cancellation mechanism 5 acts with the equal magnitude and in the reverse direction with respect to the fluctuating component of the torque generated by the turntable driving motor 3.

Thus, even when the cabinet 1 is held by insulators 6 made of an elastic material in order to prevent floor vibrations, the rotational vibrations of the cabinet 1 which are attributed to the fluctuation of the generated torque due to the variation of the torque command voltage for the driving motor 3 of the turntable 2 can be perfectly cancelled. It is therefore possible to eliminate the propagation of the vibrations to the tone arm 4 mounted on the cabinet 1, and accordingly to the tip of the stylus carried thereon, and to fundamentally prevent the adverse effect on the playback signal of a record.

Figure 11A:
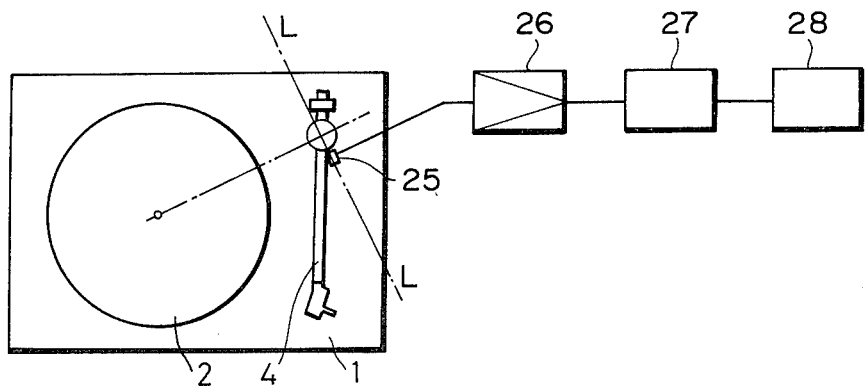
Figure 11B:
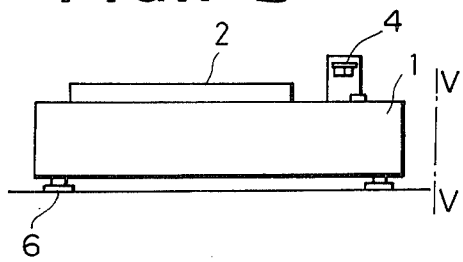
Figure 12A:
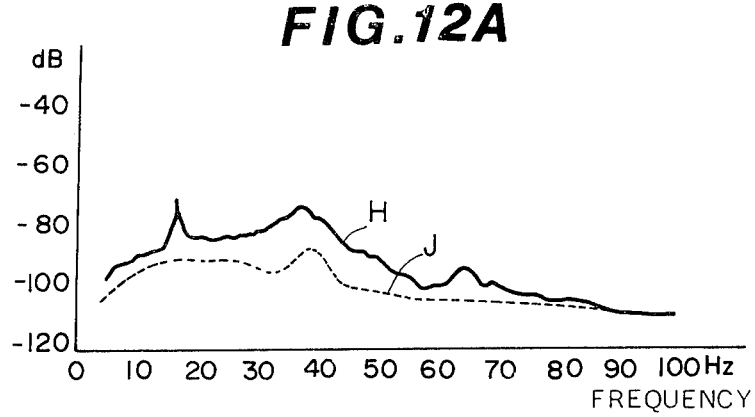
FIGS. 12A and 12B are graphs showing measured results.
Figure 12B:
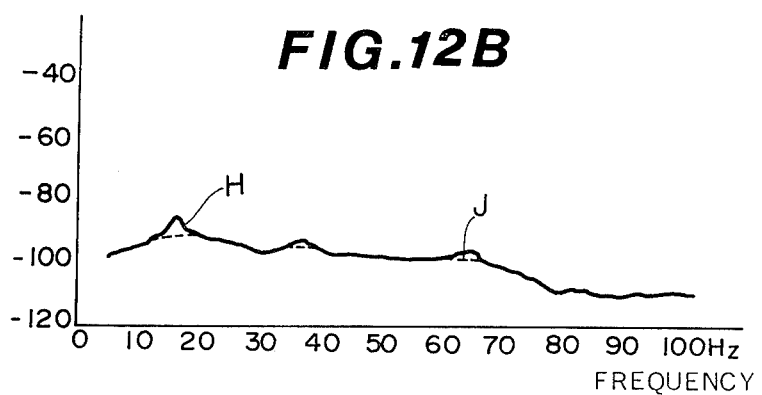

In this regard, as illustrated in FIGS. 11A and 11B, vibrations in the support portion of the tone arm 4 were detected in the horizontal direction (indicated at L—L in FIG. 11A and the vertical direction (indicated at V—V in FIG. 11B) by a vibration pickup 25, respectively. The detected signals were amplified by an amplifier 26, analyzed by a frequency analyzer 27 and recorded by a recorder 28. FIGS. 12A and 12B are graphs showing the results, and they correspond to the L—L direction and the V—V direction, respectively. In each graph, curve H (solid line) is a characteristic obtained in the state in which the cancellation mechanism 5 was not operated, while J (broken line) is a characteristic obtained, in the state in which the cancellation mechanism 5 was operated.

As apparent from the result, according to the embodiment, the vibrations in the holding portion of the tone arm 4 are improved and are sharply bettered over the whole frequency range especially in the horizontal direction as compared with those in the prior-art record player. Accordingly, the S/N ratio of the playback signal of the record can be remarkably enhanced.

Figure 13:
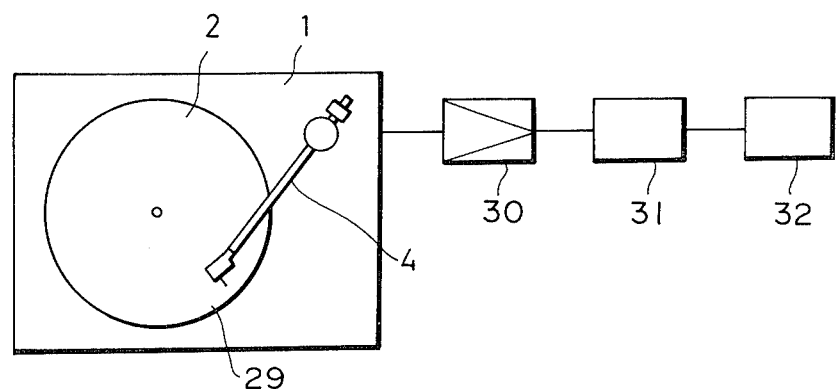
Figure 14:
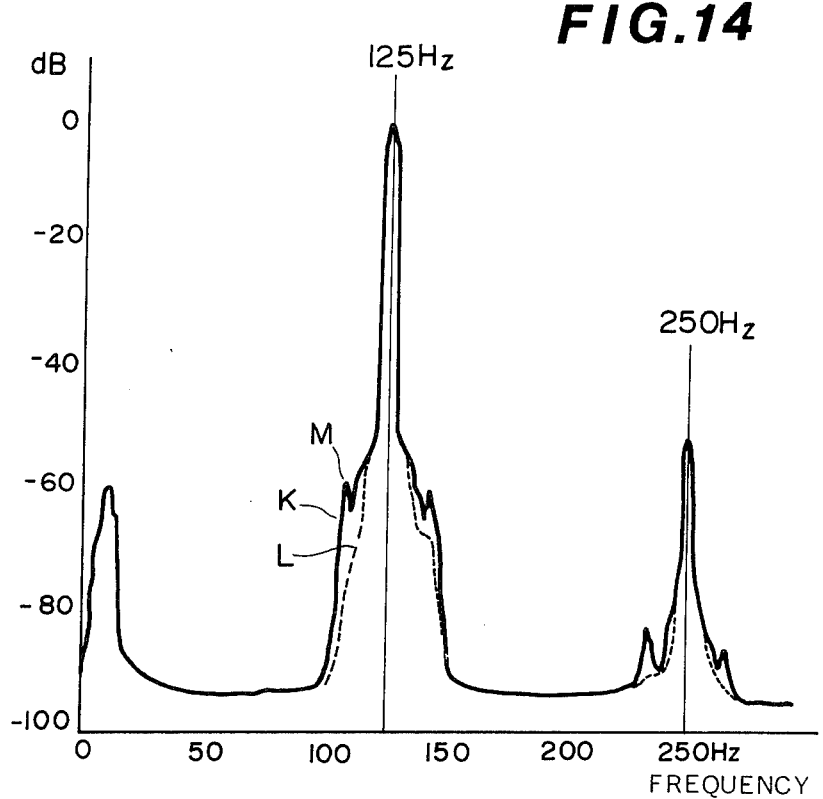
FIG. 14 is a graph showing measured results.

In addition, as illustrated in FIG. 13, a test record 29 on which a signal of 125 Hz was recorded was played back, and the playback output was amplified by an amplifier 30, analyzed by a frequency analyzer 31 and recorded by a recorder 32. FIG. 14 is a graph showing the result. In the graph, curve K (solid line) is a characteristic obtained in the state in which the cancellation mechanism 5 was not operated, while curve L (broken line) is a characteristic obtained in the state in which the cancellation mechanism 5 was operated. As apparent from the result, according to the embodiment, a peak (indicated at M) in the vicinity of the playback frequency 125 Hz disappears, and the cross modulation distortion characteristic can be rendered very good.

Figure 15:
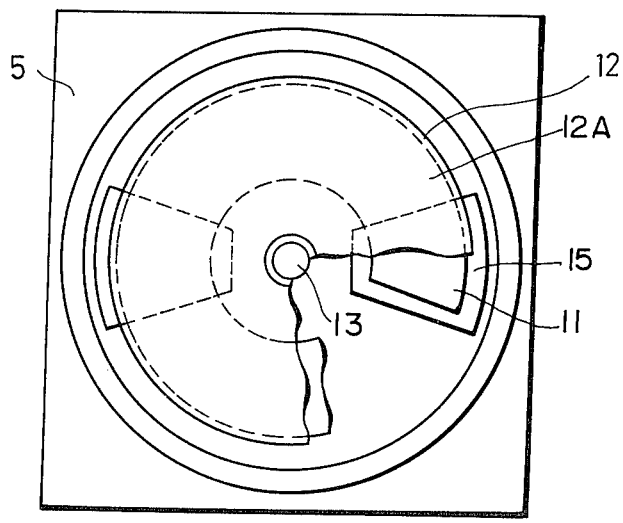
FIG. 15 is a plan view of a cancellation mechanism of a further embodiment.
Figure 16:
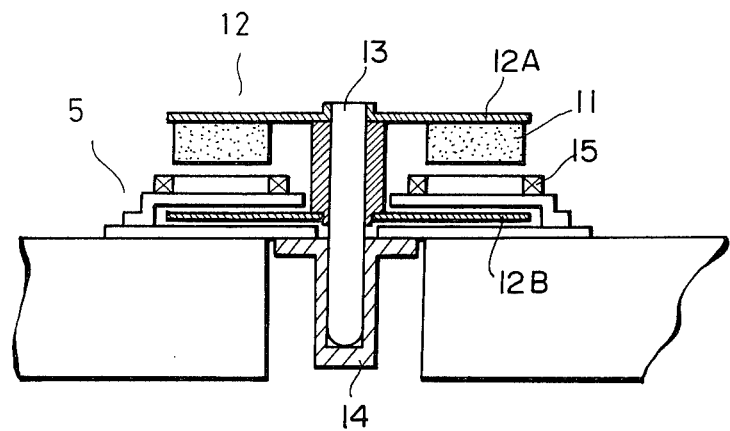
FIG. 16 is a section view of the FIG. 15 embodiment.
Figure 17:
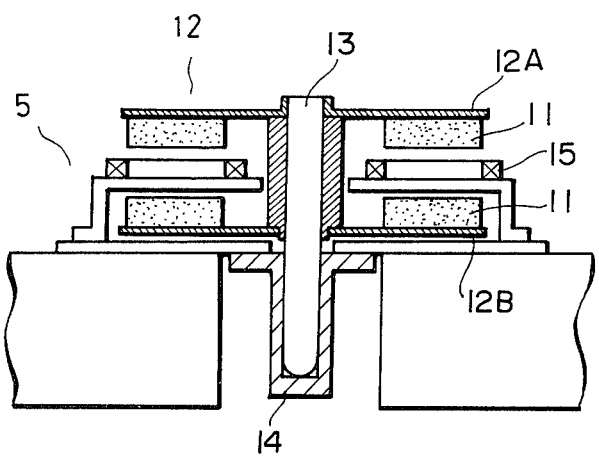
FIG. 17 is a section view of another cancellation mechanism.

While the embodiment has thus far been described, the present invention is not restricted thereto. By way of example, the cancellation mechanism may well be as shown in a plan view of FIG. 15 and a front view in FIG. 16. More specifically, yokes 12A and 12B are mounted on a center shaft 13, and the resultant structure is rotatably held. This construction can prevent a pressure on a bearing 14 ascribable to a magnetic attractive force occurring between each rotor magnet 11 and the lower yoke 12B and an eddy current loss as well as a hysteresis loss generated by the rotation of the rotor magnets 11. In this case, as shown in a front view of FIG. 17, rotor magnets 11 may well be disposed also on the upper surface of the lower yoke 12B so as to establish an intense magnetic force.

Figure 18:
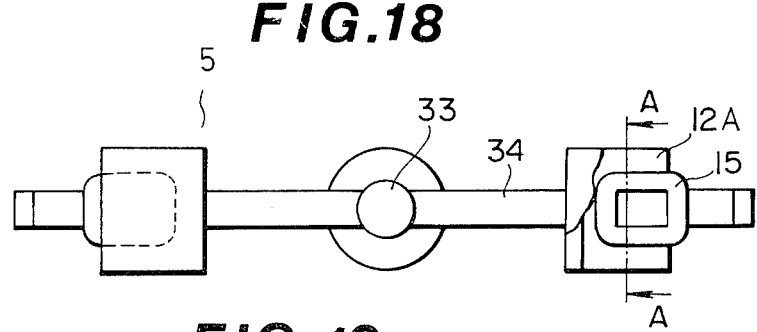
FIGS. 18 to 19 are respectively a plan and front view of yokes and magnets of an embodiment of the present invention.
Figure 19:
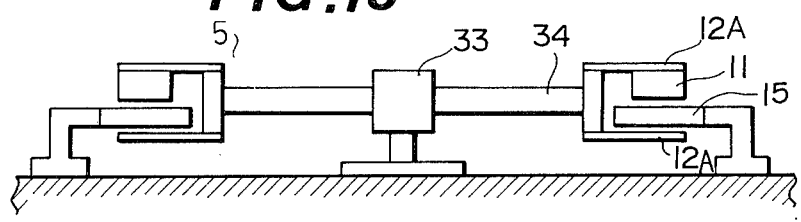
Figure 20:
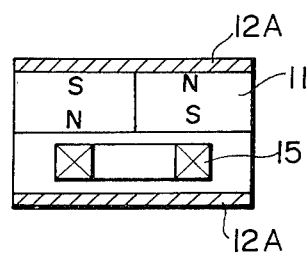
FIGS. 20, 21 and 22 are sectional views of modifications of the embodiments.
Figure 21:
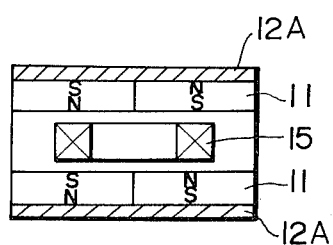
Figure 22:
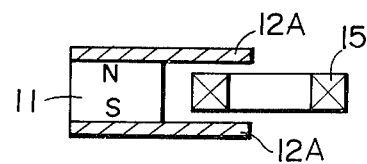

As illustrated in a plan view and a front view in FIGS. 18 and 19, respectively, yokes 12A and magnets 11 opposing to each other may well be disposed at both ends of an arm 34 the central part of which is rotatably held by a bearing 33. Each driving coil 15 held on the side of a stationary member is interposed between the opposing surfaces of the yokes 12A. FIG. 20 is a sectional view taken along line A—A in FIG. 18. In this case, as illustrated in FIG. 21, rotor magnets 11 may well be respectively mounted on the upper and lower yokes 12A, with the driving coils 15 being interposed therebetween. As illustrated in FIG. 22, the magnets 11 may well be sandwiched between the upper and lower yokes 12, with the driving coil 15 being juxtaposed to the magnets 11.

Figure 23:
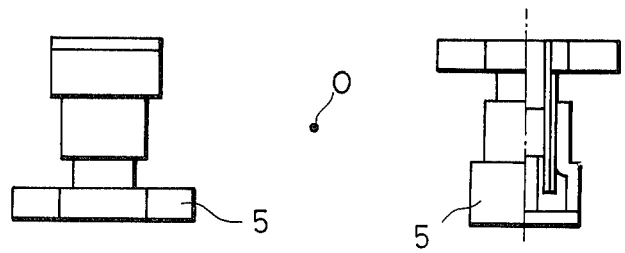
FIGS. 23 and 24 are respectively a plan view and front view of another embodiment of the cancellation mechanism.
Figure 24:
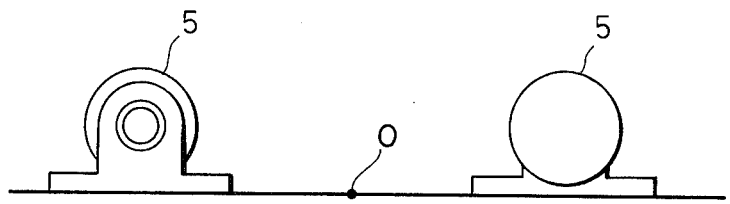
Figure 25:
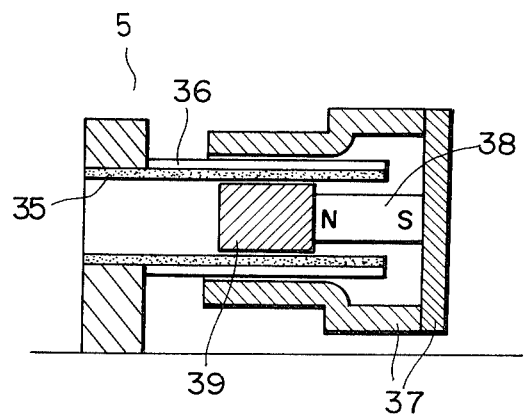
FIG. 25 is a sectional view of the cancellation mechanism.

Further, the structure of the cancellation mechanism may well be such that, as shown in a plan view of FIG. 23 and a front view of FIG. 24, no shaft is disposed at the center of rotation, O. More specifically, on a plane orthogonally intersecting the extension line of the axis of rotation of the driving motor 3 of the turntable 2, a plurality of constituent units of the cancellation mechanism are installed at positions symmetric with respect to the point of the intersection. As shown in a sectional view of FIG. 25, the constituent unit of the cancellation mechanism includes a driving coil 36 which is wound on a bobbin 35 held on the side of a stationary member, and a bottomed cylindrical yoke 37 which is disposed around the coil 36 in a manner to advance and retreat in the axial direction thereof. A rod-shaped magnet 38 is disposed in a manner to extend from the central part of the inner bottom of the yoke 37 toward the opening thereof, and has a pole piece 39 attached to the front end thereof. The advancing and retreating direction of the yoke 37 and the magnet 38 with the pole piece 39 is so set as to become tangential to a circle depicted around the center of rotation, O.

Figure 26A:
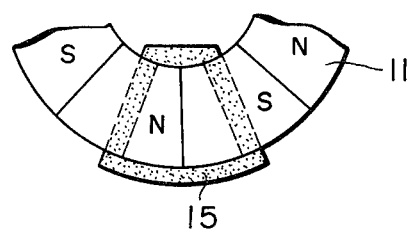
FIGS. 26A to 26C show the relationship between a rotor and coil.
Figure 26B:
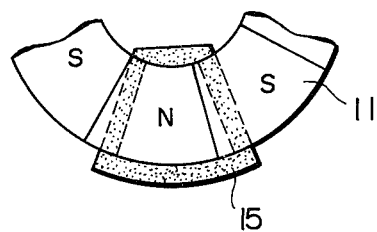
Figure 26C:
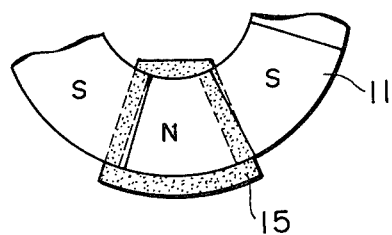

In the foregoing embodiments, the cancellation mechanism 5 effects the rotational reciprocating motion. In some cases, however, the relative positions between the rotor magnets 11 and the driving coil 15 deviate gradually on account of a very great level of the input signal to the driver circuit of the cancellation mechanism or the drift of the driver circuit. By way of example, in a case where as illustrated in a plan view of FIG. 26A, the boundary of the S-pole and N-pole of the rotor magnets 11 lies substantially in the middle of the driving coil 15, a torque in a desired direction can be produced according to the sign of a driving current. However, when the relative positions of the rotor magnets 11 and the driving coil 15 deviate as illustrated in FIG. 26B or 26C, unfavorably there is the possibility that the direction of a generated torque will be reverse. When the direction of the torque generated by the cancellation mechanism 5 is reverse, this torque is added to the counteractive torque developed by the driving motor 3, so that the vibrations increase. In such case, the rotor magnets may have their position detected so as to limit their rotational range within a predetermined angle.

Figure 27:
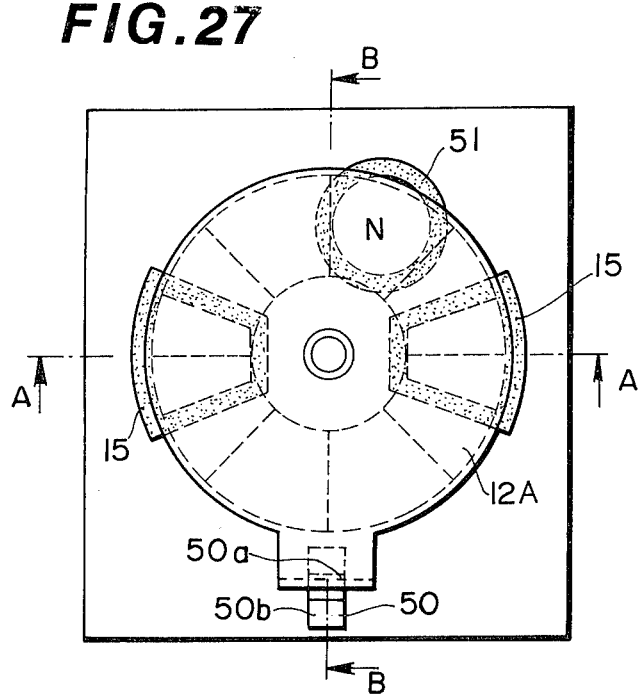
FIG. 27 is a plan view of another embodiment of the invention.
Figure 28A:
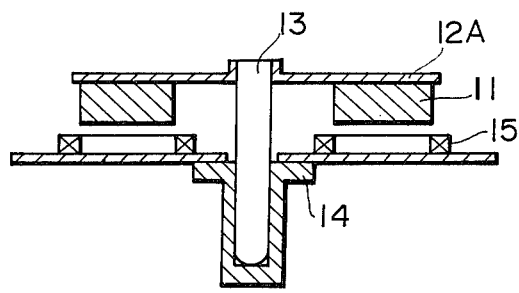
FIGS. 28A and 28B are sectional views of the embodiment shown in FIG. 27.
Figure 28B:
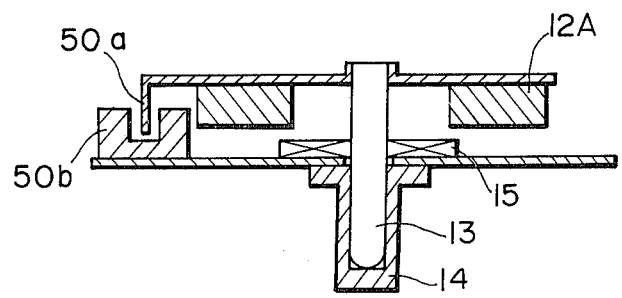

More specifically, a position sensor 50 and a positioning coil 51 are disposed as shown in a plan view of FIG. 27. When the position sensor 50 has detected that the rotor magnets 11 have deviated from an appropriate position, the positioning coil 51 is energized so as to retract the magnets to the appropriate position. FIGS. 28A and 28B are sectional views taken along line A—A and line B—B in FIG. 27, respectively. The position sensor 50 is constructed of a light shield 50a which is extended from a yoke 12A, and a photodetector 50b which consists of a light emitting element and a light receiving element located on both sides of the light shield 50a on the side of a stationary member. In response to the deviation of the rotor magnets 11 from the appropriate position, light falls on the light receiving element of the photodetector 50b, whereupon the positioning coil 51 is energized so as to bring the magnets back to the appropriate position.

Figure 29:
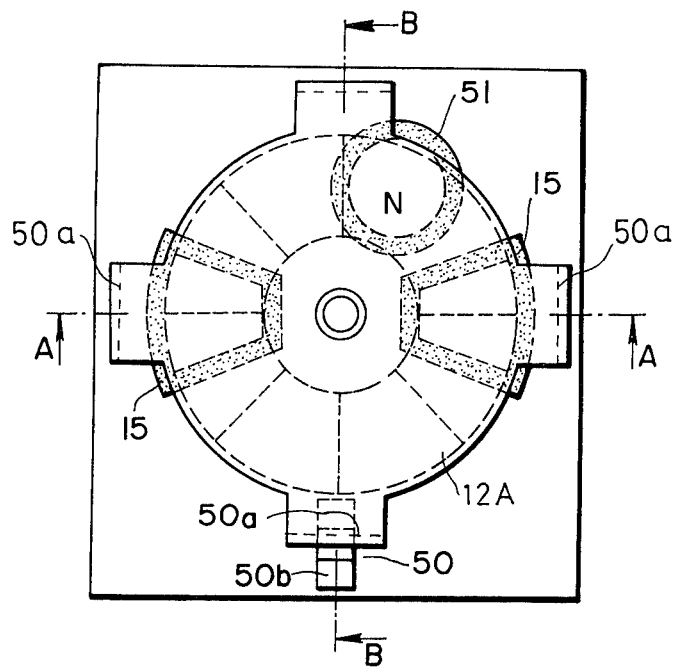
FIG. 29 and FIGS. 30 and 31 are respectively a plan view and sectional views of another embodiment.
Figure 30:
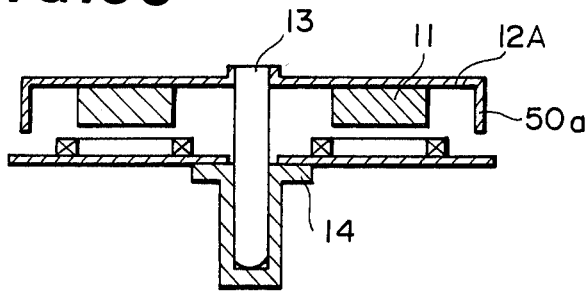
Figure 31:
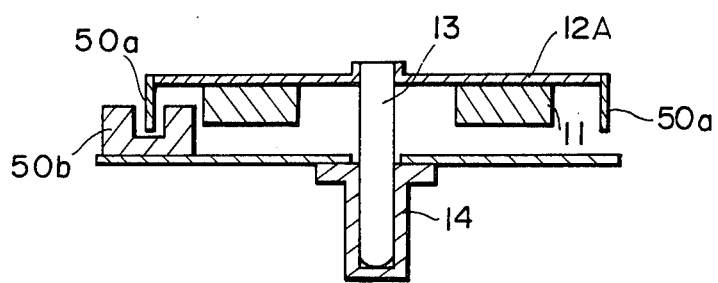
Figure 32:
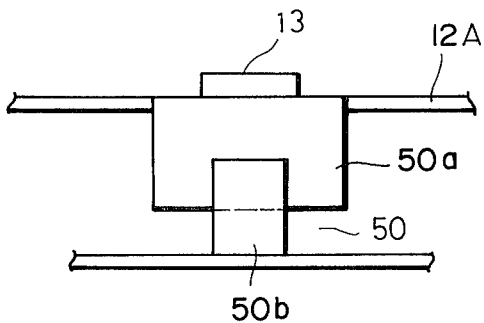
FIG. 32 is a front view of a position sensor.
Figure 33:
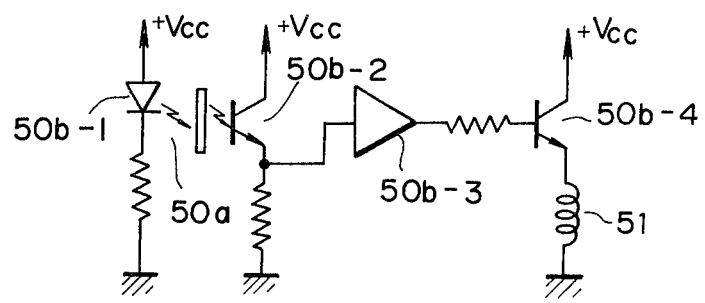
FIG. 33 shows a circuit diagram used for the FIG. 32 sensor.

In this case, four light shields 50a may well be disposed at angular intervals of 90 degrees as illustrated in a plan view of FIG. 29 (and sectional views of FIGS. 30 and 31 as taken along line A—A and line B—B in FIG. 29, respectively). With this measure, whatever relation the positions of the rotor magnets 11 and the driving coils 15 may lie in, proper positioning can be carried out. In addition, FIG. 32 is a front view showing the position sensor 50, in which the light shield 50a covers the predetermined rotational range of a center shaft 13. FIG. 33 is a diagram showing an electrical circuit. The light shield 50a is located between the light emitting element 50b-1 and the light receiving element 50b-2, an output of the latter element is amplified by an amplifier 50b-3, the amplified signal is applied to a switching transistor 50b-4, and an exciting current is impressed on the positioning coil 51 connected in series with the emitter of the transistor.

Figure 34:
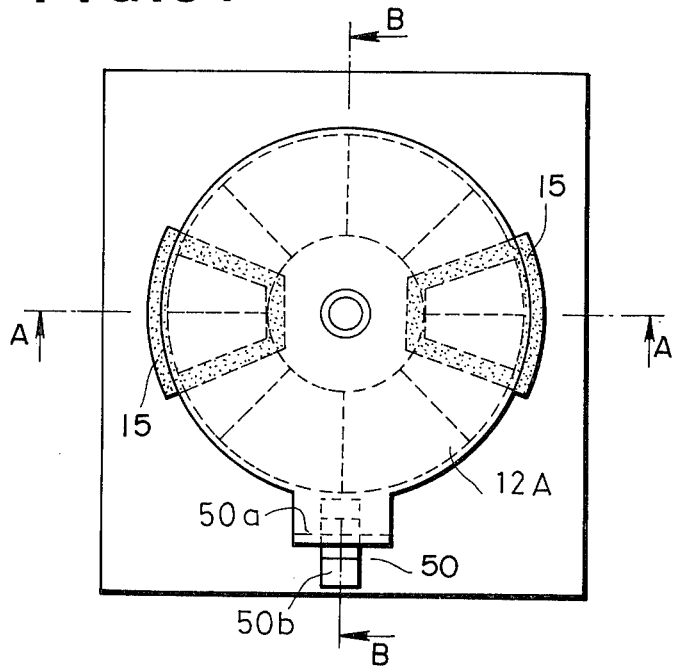
FIG. 34 and FIGS. 35A and 35B are respectively a front view and sectional views of another embodiment.
Figure 35A:
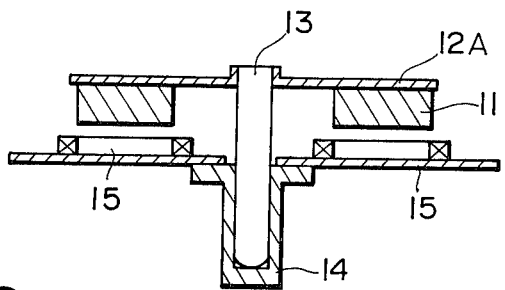
Figure 35B:
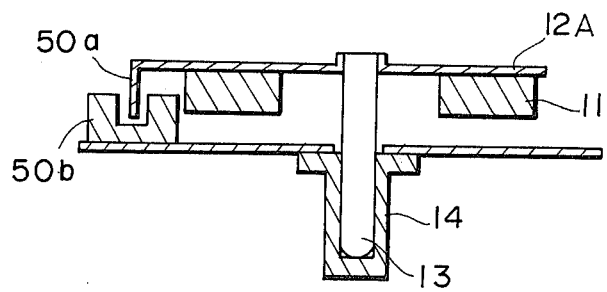
Figure 36:
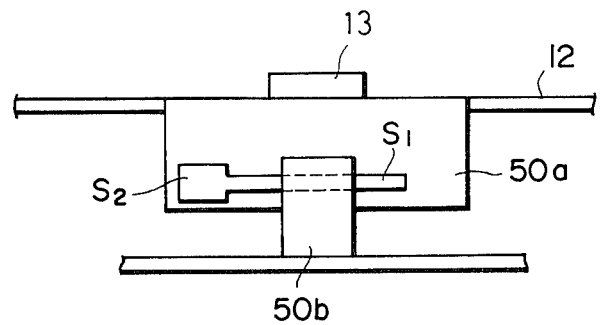
FIG. 36 is a front view of a light shield portion.
Figure 37:
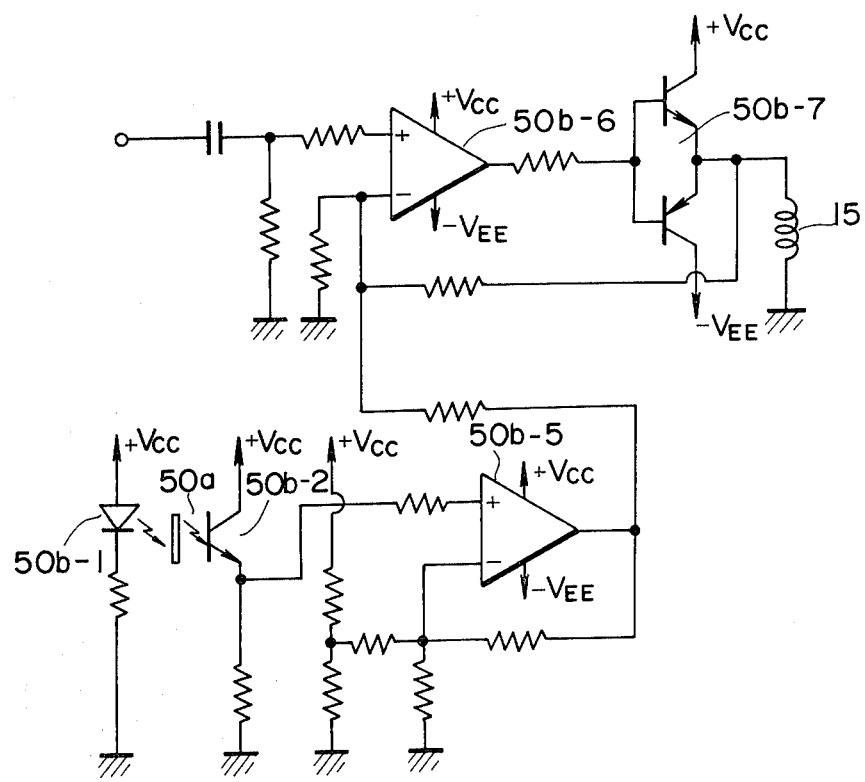
FIG. 37 is a circuit diagram used for the shield.

In a further modification, the plan view of which is shown in FIG. 34 and the sectional views of which along line A—A and line B—B in FIG. 34 are respectively shown in FIGS. 35A and 35B, the rotor magnets 11 are positioned by the driving coils 15 without especially disposing any positioning coil. As shown in a front view of FIG. 36, the light shield 50a is so constructed that a half quantity of light is passed by a slit $S_1$ in the appropriate range, that the total quantity of light is passed by a slit $S_2$ at the left end of the light shield, and that the total quantity of light is isolated at the right end. FIG. 37 is an electrical circuit diagram. The output of the light receiving element 50b-2 is applied to the noninverting input of a differential amplifier 50b-5, the inverting input of which is supplied with a voltage corresponding to the quantity of incident light at the appropriate position. An output from the differential amplifier 50b-5 is applied to the inverting input of differential amplifier 50b-6. On the other hand, the noninverting input of the differential amplifier 50b-6 is supplied with the A.C. component of the torque command voltage for the driving motor 3. An output from the differential amplifier 50b-6 is used to control a driving transistor pair 50b-7 so as to energize the driving coil 15 or the positioning coil.

Figure 38:
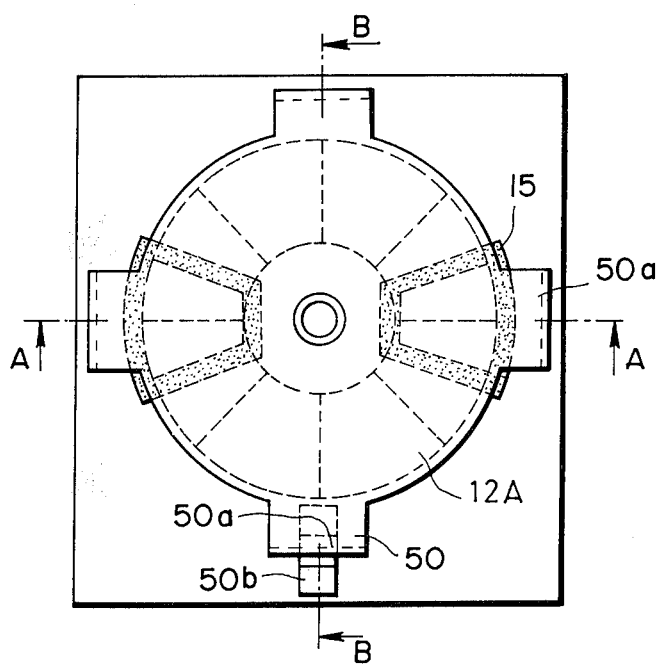
FIGS. 38, 39A and 39B are a plan view and sectional views of another embodiment.
Figure 39A:
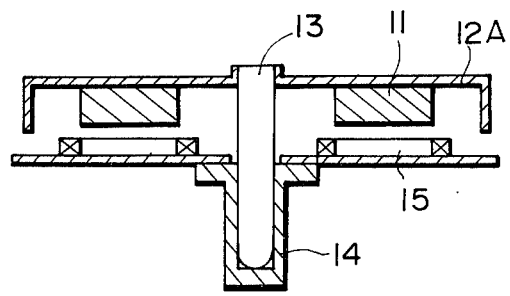
Figure 39B:
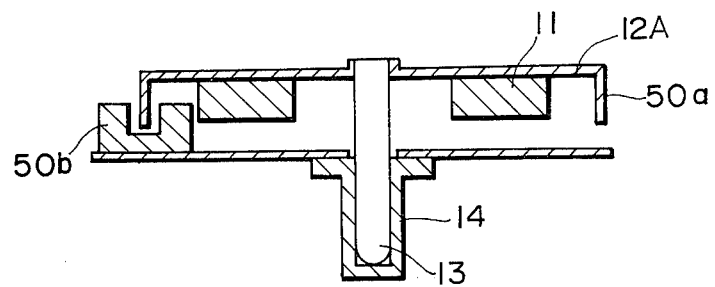

In this case, four light shields 50a may well be arranged at angular intervals of 90 degrees as illustrated in a plan view of FIG. 38 and sectional views of FIGS. 39A and 39B as respectively taken along line A—A and line B—B in FIG. 38.

Figure 40:
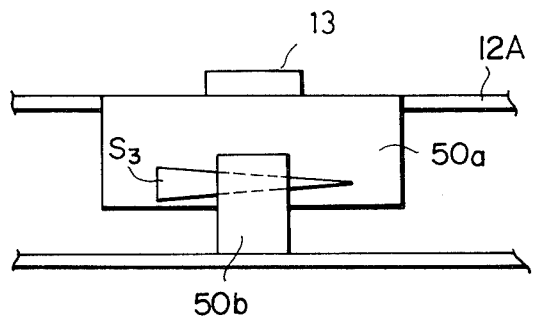
FIG. 40 is a front view of the light shield portion of the previous embodiment.
Figure 41:
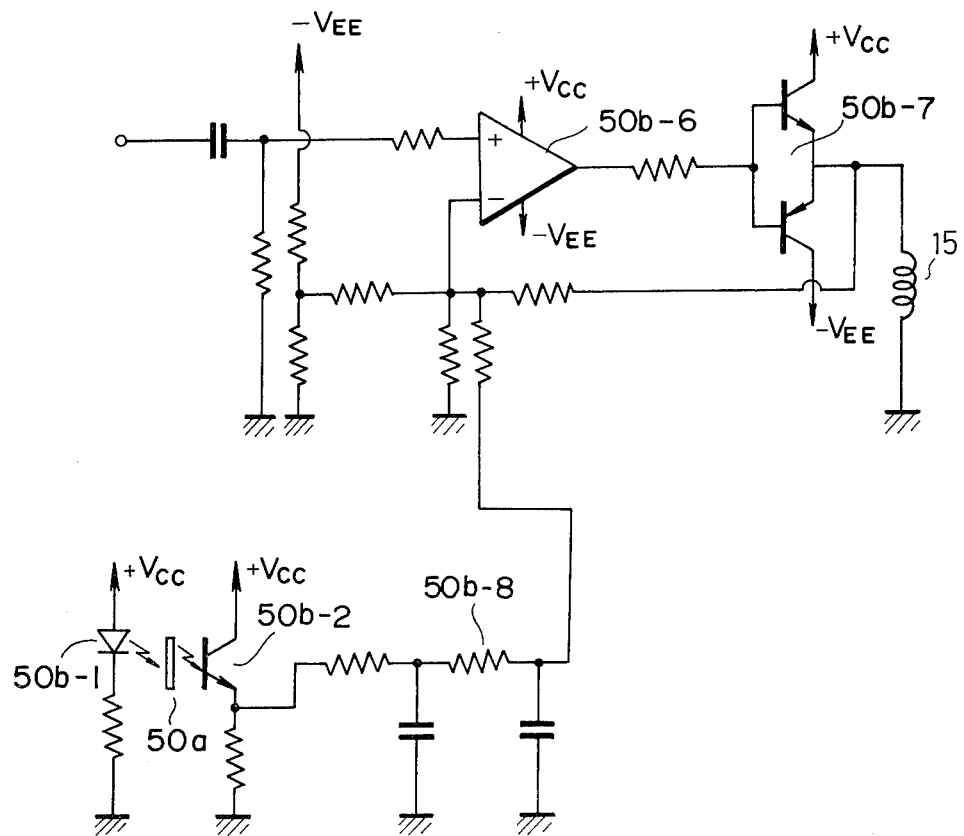
FIG. 41 is a circuit diagram for the FIG. 40 shield.

In another modification illustrated in a front view of FIG. 40 and a circuit diagram of FIG. 41, the light shield 50a is formed with a wedged-shaped slit $S_3$ so as to obtain from the light receiving element 50b-2 a signal which varies continuously in accordance with the position of the light shield. In this case, in order to derive a D.C. voltage signal which is proportional to the central position of the motion of the rotor magnets executing the rotational reciprocating motion, the position detection signal provided from the light receiving element 50b-2 is once passed through an integration circuit 50b-8 and then applied to the inverting input of the differential amplifier 50b-6.

Figure 42A:
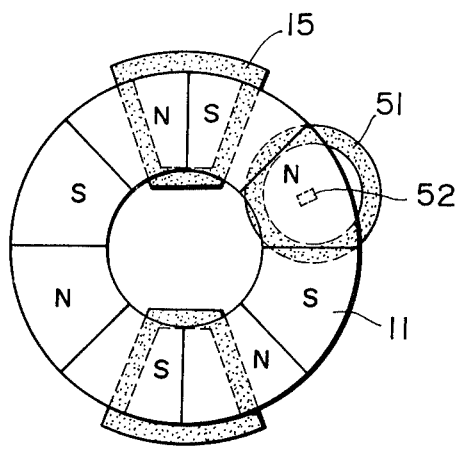
FIGS. 42A and 42B are a plan view and a circuit diagram of another embodiment.
Figure 42B:
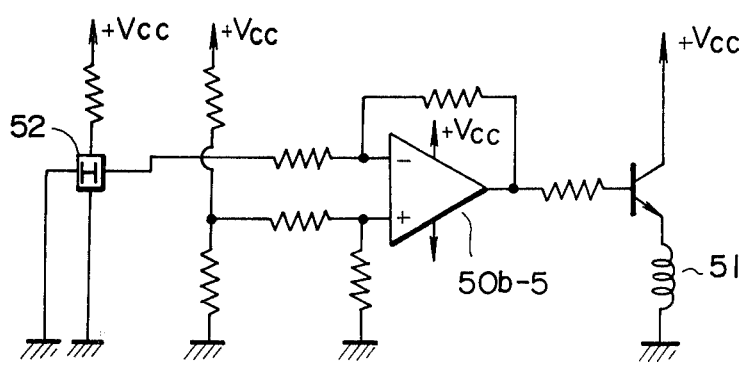
Figure 43A:
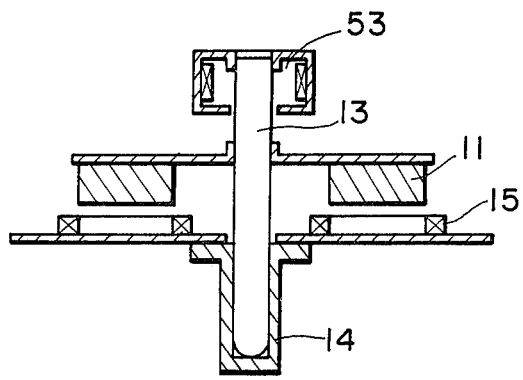
FIGS. 43A and 43B are a sectional view and circuit diagram of another embodiment, respectively.
Figure 43B:
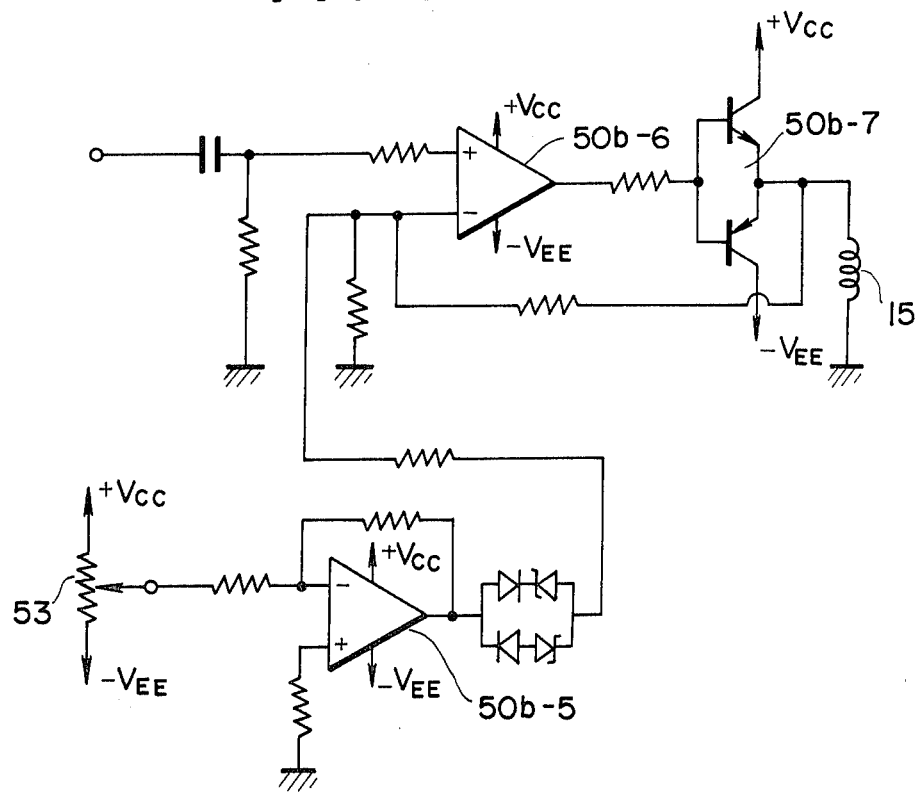
Figure 44A:
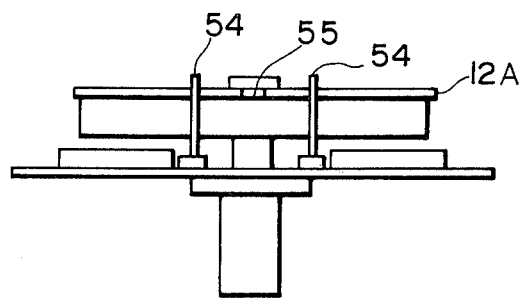
FIGS. 44A, 44B and 44C are a front view, plan view and a circuit diagram of another embodiment.
Figure 44B:
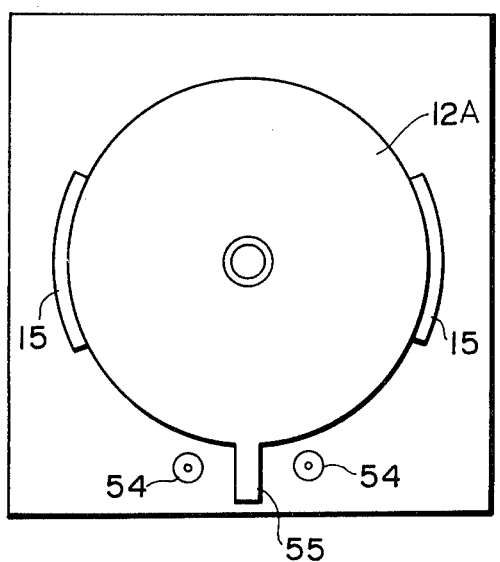
Figure 44C:
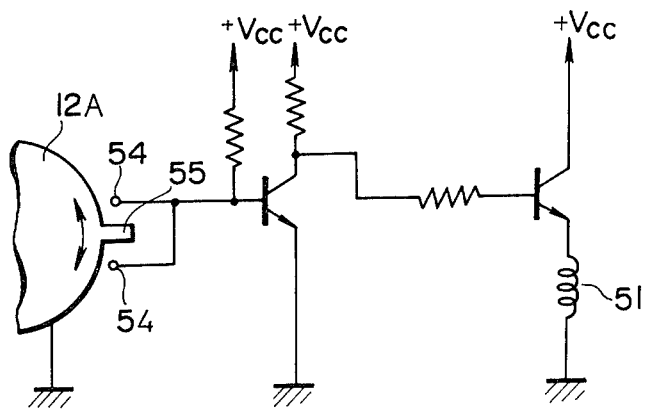
Figure 45A:
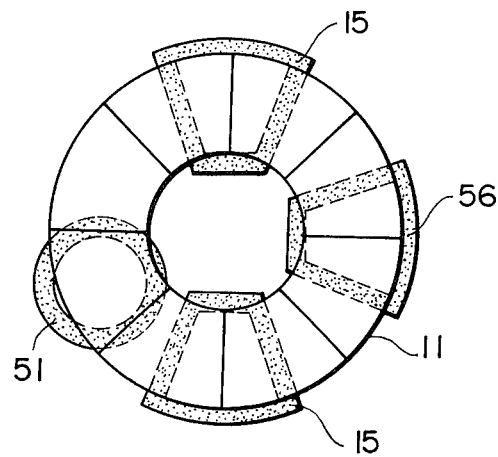
FIGS. 45A and 45B are a plan view and circuit diagram of a final embodiment.
Figure 45B:
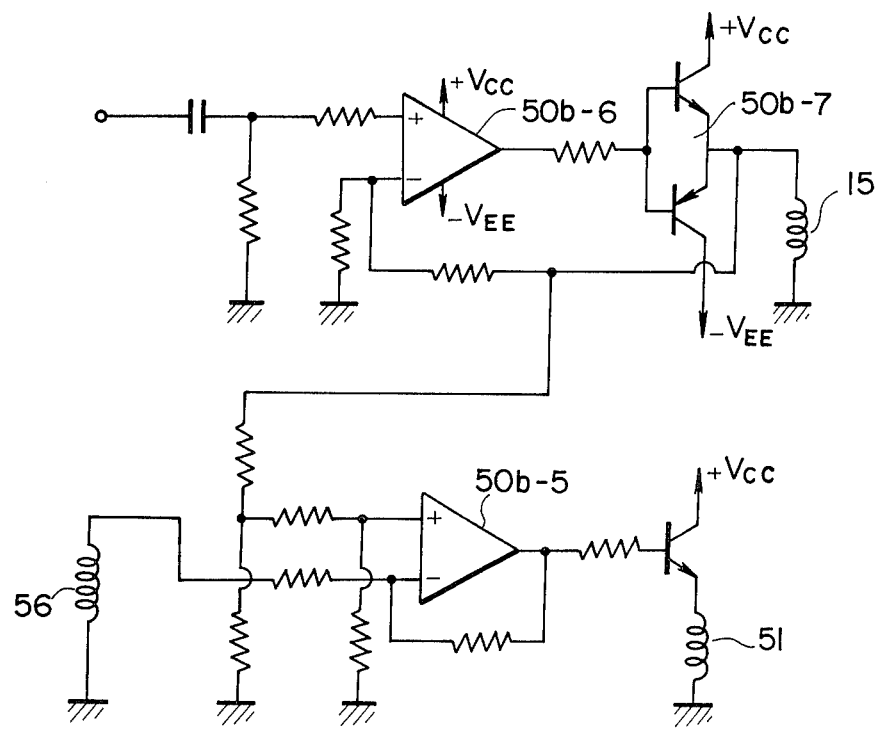

Further, as the means for detecting the position of the rotor magnets 11, a Hall element 52 may well be arranged on the stationary member side as shown in FIGS. 42A and 42B, or potentiometer 53 interlocking with the center shaft 13 may well be used as shown in FIGS. 43A and 43B. A measure illustrated in FIGS. 44A to 44C may well be adopted, in which electric contacts 54 are disposed at the limits of the appropriate range and a protrusion 55 provided in the yoke 12A is adapted to abut against the electric contact so as to form an electric circuit. As illustrated in FIGS. 45A and 45B, to the end of detecting the position of the rotor magnets 11, a detecting coil 56 is disposed in a position magnetically equivalent to the driving coil 15, and a detection signal thereof is applied to the inverting input of the differential amplifier 50b-5. Further,, a voltage proportional to the driving current flowing through the driving coil 15 is divided, and a driving signal thus made a voltage equal in magnitude to the detection signal is applied to the noninverting input of the differential amplifier 50b-5.

In this way, within the appropriate range, the inverting and noninverting inputs of the differential amplifier 50b-5 become equal in magnitude to each other, the output voltage of the differential amplifier becomes null, and no current flows through the positioning coil 51. Subsequently, when the positional relation between the rotor magnets 11 and the driving coil 15 has fallen into the state as shown in FIG. 26C, the detection signal is obtained as a signal opposite in phase to the driving signal. Since, at this time, the inverting and noninverting inputs of the differential amplifier 50b-5 are supplied with the signals opposite in phase to each other, the output voltage of this differential amplifier becomes the sum between the detection signal and the driving signal and appears as a great magnitude. By conducting current to the positioning coil 51 on the positive voltage side of the output signal, the positioning may be effected.

As described above in detail, according to the present invention, a record player of the direct drive system is provided, coaxially with a driving motor, with a cancellation mechanism which generates a torque euqql in magnitude and reverse in direction with respect to a torque fluctuation developed by the rotation of the driving motor, so that the record player capable of cancelling the occurance of vibrations and producing a playback signal of high quality can be provided.

We claim:

1. A disc record player of the direct drive type including a cabinet (1), a turntable (2), a motor (3) mounted on the cabinet and having a shaft directly mechanically coupled to the turntable for rotatably driving the turntable, a tone arm (4) mounted on the cabinet, and servo-loop means (FIG. 10) for controlling said motor to drive said turntable at a predetermined rotational speed, said motor exerting a torque (C) on the turntable and a counter torque (D) on the cabinet, and said torques comprising constant and fluctuating components; characterized by: a cancellation mechanism (5) mounted on the cabinet, and means for reciprocatingly rotationally driving said cancellation mechanism to generate a torque (F) equal in magnitude and opposite in direction to the fluctuating counter torque component developed by the rotation of said drive motor, to thereby cancel vibrations exerted on the cabinet and tone arm of said record player by said drive motor.

2. The record player acording to claim 1, wherein said cancellation mechanism is disposed coaxially with respect to said drive motor on the cabinet.

3. The record player as defined in claim 2, wherein said cancellation mechanism comprises at least one driving coil and a magnet rotor which is driven to reciprocatingly rotate by said driving coil, and rotational positions of said magnet rotor are held in a predetermined range.

4. The record player according to claim 3, wherein said cancellation mechanism has a single driving coil.

5. The record player according to claim 3, wherein said cancellation mechanism has a plurality of driving coils.

6. The record player according to claim 1, wherein said driving means comprises means for detecting a rotation speed of the turntable, means for performing a frequency-voltage coverting operation with regard to the output of said rotation speed detection means, means for comparing a phase of the rotation speed output with that of an output of a reference oscillator and means for amplifying an a.c. component of the outputs of said frequency-voltage converter and said phase comparison means, thereby to drive said cancellation mechanism.

7. The record player according to claims 3, wherein said driving coil is disposed between a rotor having a magnet provided on a disc-shaped yoke and a stationary yoke.

8. The record player according to claim 7 wherein a second disc-shaped yoke is disposed on a rotor axis to which a first disc-shaped yoke having a magnet is disposed and a driving coil provided on a stationary member is disposed between the magnet and the second disc-shaped yoke.

9. The record player according to claim 8 wherein a magnet provided on the second disc-shaped yoke.

10. The record player according to claim 1 wherein the cancellation mechanism is provided on both ends of an arm whose center is rotatably pivoted.

11. The record player according to claim 10 wherein the cancellation mechanism comprises parallel yokes provided on both ends of the arm, magnets disposed in parallel to each other on one of said parallel yokes so as to have opposite polarities, and a driving coil provided on the stationary member and between said magnet and the other of said yokes.

12. The record player according to claim 10 wherein magnets are respectively disposed on the inner sides of parallel yokes, and a driving coil is provided on a stationary member and between said magnets.

13. The record player according to claim 10 wherein magnets are provided between both ends of the arm, N and S pole of each of said magnets are interposed between extended yokes and a coil is provided on a stationary member and between said yokes.

14. The record player according to claim 1 wherein plural cancellation mechanisms are provided in a plane perpendicular to an extention line of a rotation axis of the turntable and are installed at positions symmetric with respect to the point of the intersection of the extention line and the plane.

15. The record player according to claim 14 wherein said cancellation mechanisms are driven in opposite direction.

16. The record player according to claim 14 wherein said cancellation mechanisms each comprises a driving coil wound on a bobbin, a bottomed cylindrical yoke disposed around the coil, and a rod-shaped magnet and pole piece disposed on the central part of the bottom of the yoke, thereby making the bottomed cylindrical yoke movable along the axis of the bobbin.

17. The record player according to claim 3 comprising a position detection coil and means for keeping a rotation position of the rotor at a predetermined position.

18. The record player according to claim 17 wherein plural position detection means are provided.

19. The record player according to claim 17 wherein a switching means is biased by an output from said position detection means to be caused to turn on and to provide a detection coil with an exciting current.

20. The record player according to claim 17 wherein the driving coil operates as a positioning coil.

21. The record player according to claim 20 wherein the position detection means comprises a light emitting and receiving means and a light shield constructed to have parts in which a half quantity of light is passed, the total quantity of light is passed and the total quantity of light is isolated.

22. The record player according to claim 20 wherein plural position detection means are provided.

23. The record player according to claim 20 wherein said light shield comprises a wedge-shaped slit.

24. The record player according to claim 17 wherein the position detection means comprises a Hall element.

25. The record player according to claim 17 wherein the position detection means comprises a potentiometer.

26. The record player according to claim 17 having a position detection means including a projection provided on the rotor surface of the yoke and an electric contact provided at a proper limitation of the position.

27. The record player according to claim 17 having a positon detection means comprising a detection coil provided at a positon magnetically equal to that of the driving coil.

* * * * *